J. D. Patton,
Bed Bottom,

№ 57,560. Patented Aug. 28, 1866.

UNITED STATES PATENT OFFICE

JOSHUA D. PATTON, OF DAVENPORT, IOWA.

IMPROVED BED-BOTTOM.

Specification forming part of Letters Patent No. 57,560, dated August 28, 1866.

*To all whom it may concern:*

Be it known that I, JOSHUA D. PATTON, of Davenport, Scott county, and State of Iowa, have invented a new and useful Improvement in Bed-Bottoms; and I do hereby declare that the following is a full, clear, and exact description thereof, which will enable others skilled in the art to make and use the same, reference being had to the accompanying drawings, forming part of this specification.

The present invention consists in forming the bed-bottom of a series of cords or lines made of hemp or other suitable fibrous material, which cords, at one end, are secured to or in one end or side of the frame of the bed-bottom in any proper manner, and, extending across the entire length or width of the same, pass loosely through the opposite end or side of the bed-bottom, and have heads or caps secured to their outer ends, which, by turning around in the proper direction, enable the cords to be twisted, and thus tightened, as will be obvious from the following detail description thereof, reference being had to the accompanying plate of drawings, in which—

Figure 1:
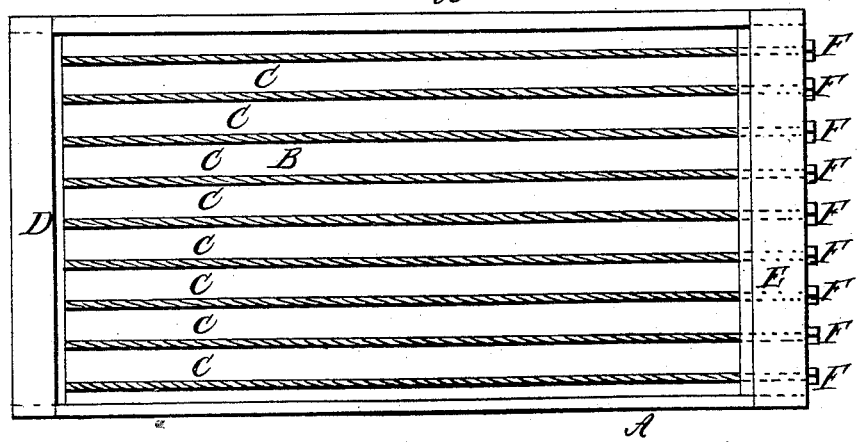
Figure 2:
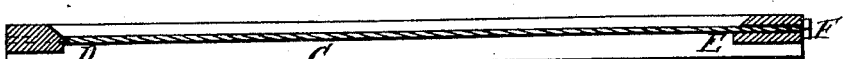

Figure 1 is a plan or top view of a bed-bottom made according to my invention, and Fig. 2 a vertical section taken in the direction of its length.

Similar letters of reference indicate like parts.

A in the drawings represents the frame of the bed-bottom, which may be made of any suitable construction and form; and B, the bed-bottom, consisting of a series of cords or other lines, C, composed of hemp or other fibrous material, and secured at one end in one of the end pieces, D, of the frame A, and passing loosely through the other or opposite end, E. Each has a head or cap piece, F, fastened to it, by the turning of which the cords can be tightened to any degree desired or deemed necessary.

From the above description of my improved bed-bottom it is plainly obvious that it is not only simple in construction, but exceedingly efficient, practical, and adaptable for use, and, besides, cheap to manufacture.

I claim as new and desire to secure by Letters Patent—

A bed-bottom composed of a series of cords or other lines, C, secured at one end to the frame of the bed-bottom and passing loosely through the other, having heads E upon their outer ends, substantially as and for the purpose described.

JOSHUA D. PATTON.

Witnesses:
 DAN H. SEVERANCE,
 PALMER I. CLARK.